(12) United States Patent
Deufel

(10) Patent No.: US 6,183,404 B1
(45) Date of Patent: Feb. 6, 2001

(54) MACHINE TOOL FOR MACHINING CAVITIES IN WORKPIECES

(75) Inventor: Karl Deufel, Kolbongen (DE)

(73) Assignee: Chiron-Werke GmbH & Co. KG, Tuttlingen (DE)

( * ) Notice: Under 35 U.S.C. 154(b), the term of this patent shall be extended for 0 days.

(21) Appl. No.: 09/202,533

(22) PCT Filed: Apr. 17, 1998

(86) PCT No.: PCT/EP98/02246

§ 371 Date: Jul. 7, 1999

§ 102(e) Date: Jul. 7, 1999

(87) PCT Pub. No.: WO98/47655

PCT Pub. Date: Oct. 29, 1998

(30) Foreign Application Priority Data

Apr. 19, 1997 (DE) .............................. 197 16 491

(51) Int. Cl.⁷ .................................................. B23Q 3/157
(52) U.S. Cl. .................................. 483/7; 483/1; 483/10; 483/13; 483/31; 483/38; 483/69; 483/900
(58) Field of Search .................................. 483/7, 10, 30, 483/31, 32, 38, 44, 45, 1, 13, 69, 900; 409/143, 144, 230; 408/194

(56) References Cited

U.S. PATENT DOCUMENTS

| | | | | |
|---|---|---|---|---|
| 3,431,635 | * | 3/1969 | Balding | 483/900 |
| 3,590,470 | * | 7/1971 | Brainard | 483/900 |
| 4,827,599 | * | 5/1989 | Winkler et al. | 483/900 |
| 4,829,862 | * | 5/1989 | Keritsis | 82/158 |
| 4,910,860 | * | 3/1990 | Wlnkler et al. | 483/31 |
| 4,923,343 | | 5/1990 | Silk . | |
| 5,068,958 | * | 12/1991 | Kosmowski | 483/10 |
| 5,107,582 | * | 4/1992 | Kessler | 483/45 |
| 5,256,010 | * | 10/1993 | Hehl et al. | 408/11 |
| 5,263,918 | * | 11/1993 | Ruetschle et al. | 483/900 |
| 5,393,288 | * | 2/1995 | Miyasaka et al. | 483/31 |
| 5,453,068 | * | 9/1995 | Rutschle et al. | 483/38 |
| 5,620,406 | * | 4/1997 | Bae | 483/38 |
| 5,624,365 | * | 4/1997 | Haninger et al. | 483/38 |
| 5,772,566 | * | 6/1998 | Schweizer et al. | 483/47 |

FOREIGN PATENT DOCUMENTS

| | | | |
|---|---|---|---|
| 3021176 | | 2/1982 | (DE) . |
| 3301334 | | 1/1991 | (DE) . |
| 4239768 | * | 6/1994 | (DE) ..................... 483/31 |
| 4300745 | * | 7/1994 | (DE) ..................... 483/30 |
| 0 132 599 | * | 2/1985 | (EP) ..................... 483/31 |
| 2256382 | * | 12/1992 | (GB) ..................... 483/10 |
| 60-44243 | * | 3/1985 | (JP) ..................... 483/31 |
| 3-92236 | * | 4/1991 | (JP) ..................... 483/10 |
| 5-104373 | * | 4/1993 | (JP) ..................... 483/7 |
| 6-63833 | * | 3/1994 | (JP) ..................... 483/7 |
| 1830330 | * | 7/1993 | (RU) ..................... 483/31 |
| WO 98/47655 | | 10/1998 | (WO) . |

OTHER PUBLICATIONS

Sep. 15, 1998 International Search Report from the European Patent Office.

Apr. 23, 1987 Patent Abstract of Japan for Publication No. 62088530.

* cited by examiner

Primary Examiner—A. L. Wellington
Assistant Examiner—Erica D. Ergenbright
(74) Attorney, Agent, or Firm—Cummings & Lockwood

(57) ABSTRACT

A machine tool (10) has a spindle (11) for receiving a tool (15) for machining a workpiece (16). A mechanism (17) for clamping the workpiece (16) is also provided. Also provided is a changing mechanism (37) for a machining tool (29), which holds the machining tool (29) in a gripper hand (38) which it introduces laterally into a workpiece cavity (21) in such a way that it can be automatically coupled there to an adapter tool (32) carried by the spindle (11).

12 Claims, 4 Drawing Sheets

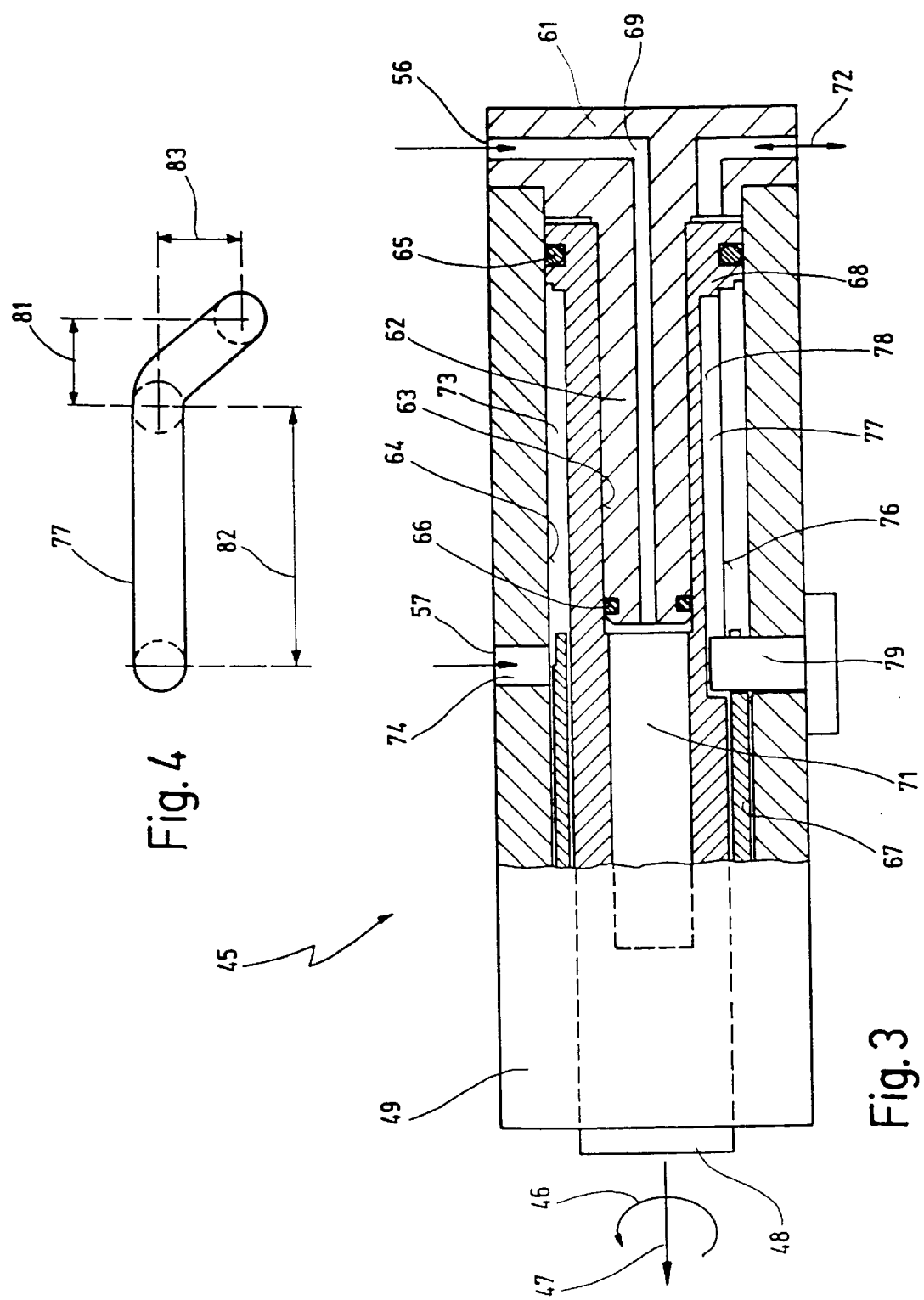

MACHINE TOOL FOR MACHINING CAVITIES IN WORKPIECES

BACKGROUND OF THE INVENTION

1. Field of the Invention

The present invention relates to a machine tool having a spindle for receiving a tool for machining a workpiece, and a mechanism for clamping the workpiece.

2. Related Prior Art

Machine tools of this kind are commonly known from the prior art.

Machine tools of this kind generally have tool changing mechanisms with which tools attached to standardized tool holders can be transferred between a tool receptacle in the spindle and a magazine position. In this manner, with a single workpiece clamping, different machining operations using different tools can be performed in succession on the clamped workpiece before it is replaced with a workpiece yet to be machined.

With machine tools of this kind, a very rapid tool change is desirable so as to minimize the time necessary for the machining occurring in one clamping, so that the machine tool's workpiece throughput is high.

A basic prerequisite for machining a workpiece using a tool clamped in the spindle is of course that the surface to be machined on the workpiece is accessible to the tool. In this connection, problems occur with internally hollow, for example bell-shaped workpieces, whose interior must be machined with a tool that, for reasons relating either to design or to clamping technology, cannot be introduced into the workpiece cavity from above. It is conceivable in the case of a bell-shaped workpiece, for example, that for other reasons related to machining technology it is clamped on the mechanism with the large opening downward, only a small opening being present toward the top, through which a milling cutter cannot penetrate into the workpiece cavity in order to perform the machining required there. To allow this machining in the interior of the workpiece to be accomplished, the workpiece must thus be reclamped, causing valuable machining time to be lost.

As an alternative to such a reclamping of the workpiece, it is also known to use a two-piece tool comprising an adapter tool and machining tool, for example the one that can be obtained from the Bilz company of Esslingen in Germany, under catalog numbers FH111992 and SS111991.

The adapter tool has a relatively thin, long shaft which is attached to the standardized tool holder and has at its free end a kind of bayonet fastener. This adapter tool is then introduced into the workpiece cavity through an opening which faces upward. A large lateral opening must then be provided in the workpiece, through which an operator can introduce the machining tool, i.e. for example the milling cutter, laterally into the workpiece cavity, and there slide it onto the free end of the adapter tool and interlock it by turning it. For this purpose, the machining tool has a retaining bore with pins which coact with the adapter tool in the manner of a bayonet fastener.

The result of this is that the workpiece cavity can be machined with a machining tool that could not have been introduced through the small upper opening, although that opening is large enough to receive the shaft of the adapter tool.

This eliminates the reclamping that would otherwise be necessary; it is now also possible to machine workpiece cavities of workpieces which do not have correspondingly large openings even on their underside, so that even a reclamping would not make it possible to machine the workpiece cavity.

On the other hand, however, it is necessary for the workpiece to have a relatively large lateral opening, which not only must allow the machining tool to be introduced into the workpiece cavity, but additionally must allow enough room for the hand of the operator who must interlock the machining tool with the adapter tool in the workpiece cavity.

Large lateral openings of this kind can cause stability problems in the workpiece, and should therefore be as small as possible. On the other hand, however, these lateral openings should be as large as possible to eliminate any risk of injury to the operator, and moreover so that the difficult task of threading the adapter tool into the machining tool can be performed as easily, quickly, and above all safely as possible.

It is clear that manipulations of this kind with adapter tools and machining tools interfere with the normal machining sequence of an otherwise fully automatic machine tool: they considerably reduce workpiece throughput during the machining of such workpieces, and moreover represent a safety risk to the operator.

SUMMARY OF THE INVENTION

In view of the above, it is an object of the present invention to improve the machine tool mentioned at the outset in such a way that with a configuration of simple design, faster machining of workpiece cavities and rapid and safe changing of a "two-piece" tool are possible, with no need for the workpiece to be reclamped or for excessively large lateral openings to be provided.

In the machine tool mentioned at the outset, this object is achieved according to the present invention in that a changing mechanism for a machining tool is provided, which holds the machining tool in a gripper hand which it introduces laterally into a workpiece cavity in such a way that it can be automatically coupled there to an adapter tool carried by the spindle. The object underlying the invention is completely achieved in this fashion.

Specifically, the inventors of the present application have recognized that first of all, a considerably narrower lateral opening is required for a mechanical gripper hand than for manual manipulations. The two-piece tool is now introduced into the workpiece cavity, so to speak, partially from above via the spindle and partially from the side via the changing mechanism, which because of the numerical controller can be accomplished in an extremely reproducible and positionally accurate manner, and considerably more reliably than by hand. Coupling of the machining tool to the adapter tool can be accomplished, for example, by the fact that the machining tool is rotated by or in the gripper hand, so that it is, so to speak, screwed onto the adapter tool, thus interlocking the bayonet fastener. On the other hand, the gripper hand can also have transverse studs or pins with which the machining tool is interlocked onto the shaft of the adapter tool.

It is thus a general advantage of the new machine tool that workpiece cavities can now be machined in completely automatic fashion without large lateral openings in the workpiece, such that the spindle and the new changing mechanism coact for tool changing purposes.

Although the new changing mechanism requires a considerable design outlay and results in appreciable costs, this is, amazingly, more than compensated for by the structural advantages that can be attained in the workpiece being machined, and by the considerably elevated machining rate. Another important advantage that may be mentioned is that the risk of injury to operating personnel is also much reduced.

It is preferred in this context if the gripper hand has two jaws which hold the machining tool in the axial direction.

The advantage here is that the gripper hand can be very narrow, since the two jaws can lie, for example, in two externally open grooves of the machining tool. This means, however, that the lateral space necessary upon introduction of the machining tool through the lateral opening into the workpiece cavity is only slightly greater than that corresponding to the width of the machining tool. This feature is thus structurally advantageous for the workpiece being machined.

It is further preferred in this context if the gripper hand has overrunnable snap-lock means for holding the machining tool, the snap-lock means preferably comprising two ball catches which are arranged opposite one another internally on the jaws.

The advantage here is that the jaws do not need to execute an opening motion in order to grasp or release the machining tool, which saves further space in the workpiece and the lateral opening. This feature is moreover advantageous in terms of design: all that needs to be provided on the gripper hand are two rigid jaws located opposite one another, between which the machining tool is inserted so that it is held nonrotatably and in the axial direction by the open grooves, and is prevented by the snap-lock means from falling out of the gripper hand.

It is further preferred if a sensor, which detects whether the machining tool is correctly received in the gripper hand, is arranged on the gripper hand.

This feature is advantageous in terms of reliable tool changing, since it prevents errors during both coupling and uncoupling. When the sensor reports to a controller that the machining tool is sitting correctly in the gripper hand, the adapter tool can be uncoupled, for example by rotating the spindle. Once the spindle has then pulled the adapter tool back, the gripper hand can be moved out of the workpiece cavity, while the sensor monitors whether the machining tool is remaining securely in the gripper hand during these operations. On the other hand, when the adapter tool has been coupled, then when the gripper hand is pulled out of the workpiece cavity, the machining tool is removed from the gripper hand by overrunning the snap-lock means, which is also reported by the sensor. If the machining tool remains behind in the gripper hand when the latter is pulled back, this represents a malfunction which is also reported.

It is preferred in general terms if the gripper hand is arranged on a retaining arm which pivots the gripper hand, once pulled back out of the workpiece, out of the region of the mechanism.

This feature is advantageous in terms of design: in its rest position, the gripper hand is located behind or next to the workpiece and above the mechanism, where it thus cannot interfere with the usual machining operation. This means, however, that the new changing mechanism can also be retrofitted to existing machine tools.

It is preferred in this context if the retaining arm is arranged on a linear/pivot drive which additionally pivots the retaining arm upward in constrainedly guided fashion during one segment of its linear stroke.

This feature is advantageous in terms of design: during a segment of the linear stroke, the linear stroke motion transitions in constrainedly guided fashion into a linear/pivot motion. This means, however, that in terms of control engineering only the linear stroke motion needs to be initiated, and the pivot motion is accomplished automatically by way of the same drive.

It is preferred in this context if at least one sensor for monitoring the linear end position, and one sensor for monitoring the pivoted end position, are provided on the linear/pivot drive.

The advantage here is that both the linear end position, in which the gripper hand is located in the workpiece cavity, and the pivoted end position, in which the gripper hand is pulled back and pivoted upward, are monitored, yielding advantages in terms of safety. It is furthermore advantageous that sequence control can be accomplished more quickly, since there is no need to define delay times during which the controller must wait before initiating the next step; instead a report is made that the respective end position has been reached, whereupon the next operation can begin immediately.

It is further preferred in this context if the linear/pivot drive comprises a piston, joined to the retaining arm, which sits rotatably and displaceably in a cylinder, the piston having on its circumferential surface a control gate in the form of an externally open groove into which engages a slide block which is joined to the cylinder.

This feature is once again advantageous in terms of design: with the control gate and slide block, a conversion of the linear stroke motion into a linear/pivot motion is accomplished in the simplest possible fashion.

It is additionally advantageous in this context if there are arranged on the circumferential surface of the piston two countersunk recesses, offset axially and radially from one another, one of which coacts with an associated sensor in the linear end position, and the other in the pivoted end position.

This feature is also advantageous in terms of design: with the two sensors, both the linear stroke and the pivot motion can be monitored, for which purpose only two countersunk recesses, with axial and radial spacings corresponding to one another, need to be provided on the circumferential surface of the piston. Since these countersunk recesses can be arranged in any desired fashion on the circumferential surface, the associated sensors can also be arranged in positions that are favorable in design terms.

The method performed according to the present invention on the new machine tool for automatic changing of a two-piece tool thus comprises in general the introduction of a machining tool into a workpiece cavity using an automatic changing mechanism, an adapter tool being introduced into the workpiece cavity by the spindle. By rotation of the spindle and/or the machining tool, the latter is then coupled to the adapter tool. The changing mechanism then pulls its hand, which until then has held the machining tool, back out of the workpiece cavity, preferably monitored by a sensor arranged on the gripper hand. As the gripper hand is being pulled back in this fashion, release of the machining tool from the gripper hand is preferably accomplished by overrunning snap-lock means which act between the gripper hand and the machining tool.

To remove the machining tool from the workpiece cavity, the gripper hand is moved back into the workpiece cavity; it automatically grasps the machining tool with its jaws by the fact that the snap-lock means are once again overrun. Correct grasping of the machining tool by the gripper hand is once again sensed and reported by the sensor.

In addition, a further sensor can be provided which monitors and reports this linear end position of the gripper hand. Uncoupling then occurs by relative rotation between spindle and adapter tool in a direction opposite to the coupling direction, whereupon the spindle first removes the adapter tool from the workpiece cavity. The gripper hand then pulls the machining tool back out of the workpiece cavity and travels into its pivoted end position, which is preferably also monitored and reported by a sensor.

It is noteworthy with regard to this method that the relative rotation direction for coupling the adapter tool into the machining tool is the same as the rotation direction with which the machining tool machines the workpiece. This ensures that the interlock between adapter tool and machining tool is not inadvertently released during workpiece machining.

Further features and advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the appended drawings and will be explained in more detail in the description below. In the drawings:

FIG. 3 shows the linear/pivot drive for the changing mechanism from FIG. 2, in a partially cutaway longitudinal section;

FIG. 4 shows a developed view of the control gate which effects the constrainedly guided pivoting motion in the linear/pivot drive of FIG. 3.

DESCRIPTION OF A PREFERRED EMBODIMENT

Figure 1:
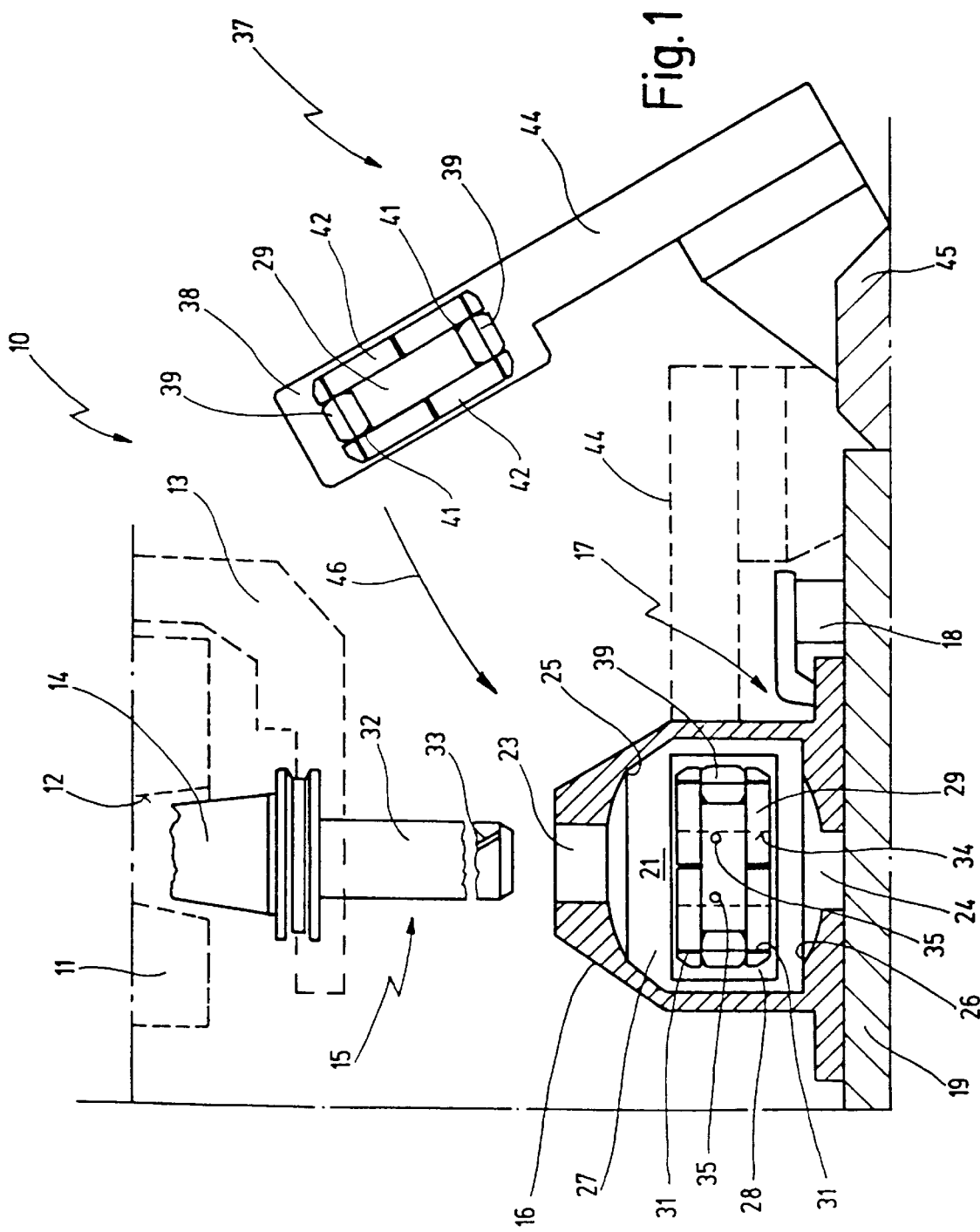
FIG. 1 shows a schematic front view of a machine tool according to the present invention, in which a two-piece tool can be changed automatically with a changing mechanism.

In FIG. 1, 10 very schematically indicates a machine tool which comprises a spindle (indicated at 11) in which a tool receptacle (indicated at 12) is provided. Machine tool 10 further has a schematically drawn tool changer 13.

Tool changer 13 holds a standardized tool holder 14 which can be inserted into tool receptacle 12. Provided on tool holder 14 is a tool 15 which serves to machine a workpiece 16 that is clamped on a mechanism indicated at 17. Mechanism 17 comprises, for example, clamping claws of which one is indicated at 18, as well as a cradle plate 19 on which workpiece 16 rests.

Workpiece 16 is shown in section in FIG. 1, thus making visible its workpiece cavity 21 into which a bore 23 leads from above and a bore 24 leads from below. The transition between workpiece cavity 21 and bore 23 or 24 is constituted by an edge 25 or 26 that is to be machined. Because the diameters of bores 23 and 24 are relatively small, the tool required for this machining operation cannot be introduced through bores 23 or 24.

For this reason, an opening 28 is provided, in a rear wall of workpiece 16 designated as 27, through which a machining tool 29 can be introduced from behind into workpiece cavity 21. This machining tool 29 is, for example, a milling cutter having cutting edges which are indicated at 31.

Associated with machining tool 29 is a shaft-like adapter tool 32, so that tool 15 for machining workpiece cavity 21 is, so to speak, a two-piece tool 15 made up of machining tool 29 and adapter tool 32.

Adapter tool 32 has at its lower, free end a bayonet fastener 33 which coacts with a retaining bore 34 in machining tool 29, for which purpose pins 35 are provided there.

While in the prior art adapter tool 29 is introduced by hand through opening 28 into workpiece cavity 21 and there coupled by hand with adapter tool 32, the new machine tool 10 has for this purpose, according to the present invention, an automatic changing mechanism 37.

Changing mechanism 37 comprises a gripper hand 38, pivoted up in FIG. 1, on which are provided two fixed jaws 39 which engage into externally open grooves 41 of machining tool 29, the groove walls being constituted by cutting parts 42 of machining tool 32. The coaction of jaws 39 and grooves 41 causes machining tool 32 to be held axially and laterally in gripper hand 38, so that said tool is nonrotatable.

Figure 2:
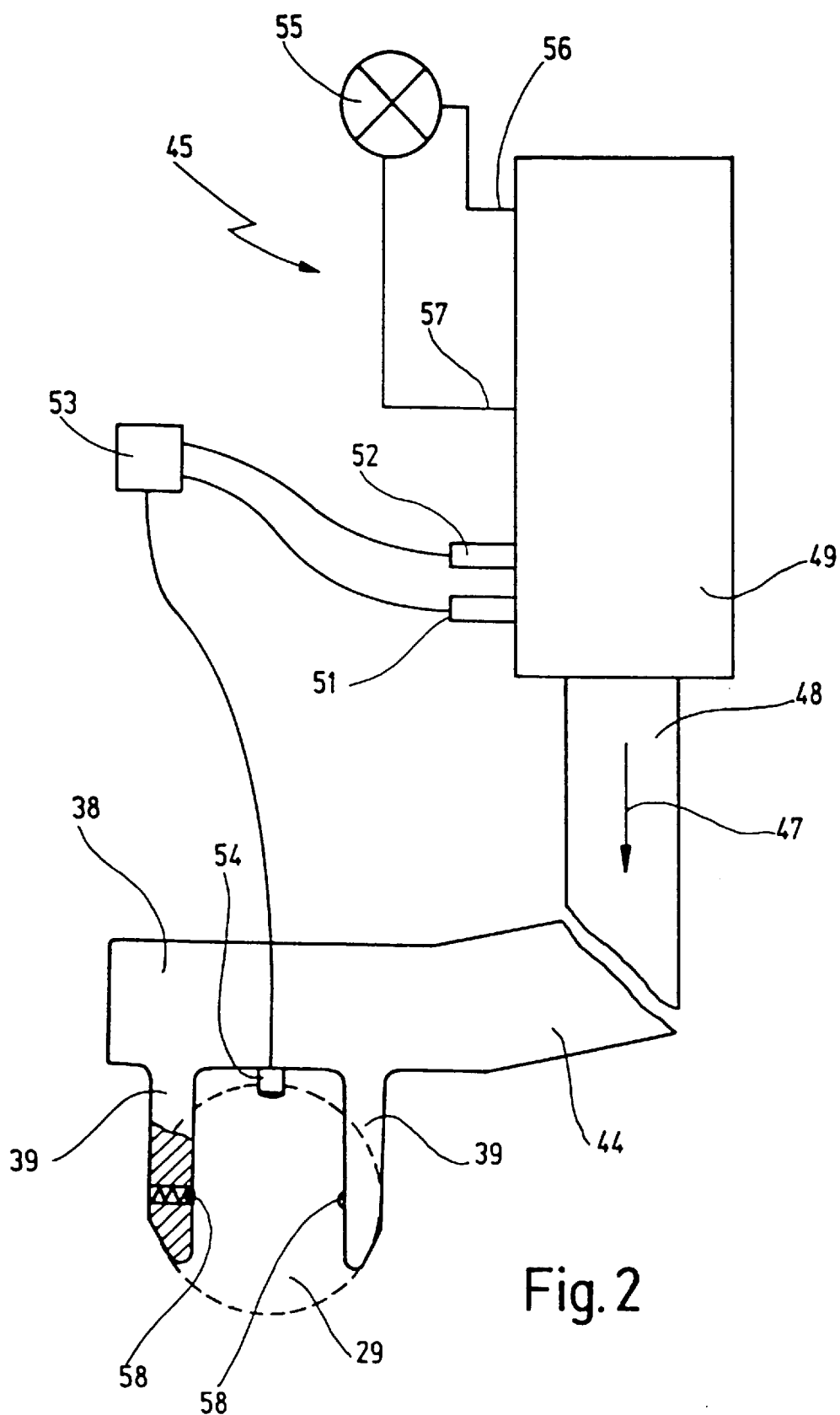
FIG. 2 shows a plan view of the changing mechanism according to FIG. 1.

Gripper hand 38 is arranged on a retaining arm 44 which in turn is attached to a linear/pivot drive 45 which is merely schematically indicated in FIG. 1. FIG. 2 shows a plan view of linear/pivot drive 45.

This linear/pivot drive operates in such a fashion that it first pivots gripper hand 38 downward in a pivot direction indicated at 46 in FIG. 1, so that it lies at the same height as opening 28. Gripper hand 38 is then moved upward out of the plane of the drawing in FIG. 1, as indicated in FIG. 2 by a linear stroke direction 47. In other words, in its pivoted end position shown in FIG. 1, the gripper hand is located behind workpiece 16 and sufficiently far above mechanism 17 that it does not impede either the usual machining operations on workpiece 16 using a tool 15 received by spindle 11, or the tilting motions of cradle plate 19. When workpiece cavity 21 is then to be machined, tool changer 13 inserts adapter tool 32 into spindle 11. At the same time, linear/pivot drive 45 pivots gripper hand 38, holding machining tool 29, downward in the direction of arrow 46 in FIG. 1 behind workpiece 16, whereupon gripper hand 38 is pushed downward in FIG. 2, so that it passes, laterally or from behind, through opening 28 into workpiece interior 21.

FIG. 1 indicates with dashed lines the position of retaining arm 44 assumed by the latter when gripper hand 39 is in its linear end position in which it holds machining tool 29 in workpiece cavity 21.

It is evident from FIG. 1 that machining tool 29 does not project laterally beyond fixed jaws 39, so that the size of opening 28 is defined only by the dimensions of machining tool 29. Spindle 11 then introduces adapter tool 32 from above through opening 23 into workpiece cavity 21, threading it into retaining bore 34. Spindle 11 then rotates adapter tool 32 so that the bayonet interlock snaps in, exploiting the fact that machining tool 29 is being held nonrotatably between jaws 39. Once coupling has occurred, gripper hand 38 is pulled back and brought into the pivoted end position shown in FIG. 1.

Returning to FIG. 2, it is evident therefrom that linear/pivot drive 45 comprises a piston 48 joined to retaining arm 44 as well as a cylinder 49 in which piston 48 is arranged, in rotatable and longitudinally displaceable fashion, in a manner yet to be described.

Arranged on cylinder 49 are two sensors 51 and 52 which are connected to a controller 53. Also shown is a sensor 54 which is arranged on gripper hand 38 and is also connected to controller 53. FIG. 2 furthermore shows an actuation mechanism 55 which conveys a pressure medium via connectors 56 and 57 to cylinder 49, so that piston 48 is moved either out or back when correspondingly acted upon.

Be it also noted that sensor 51 serves to monitor the linear end position (indicated with dashed lines in FIG. 1) shown in FIG. 2, and sensor 52 to monitor the pivoted end position shown with solid lines in FIG. 1. Sensor 54, on the other hand, is used to monitor the correct position of the machining tool, merely indicated in FIG. 2 at 29, between jaws 39.

Also evident from FIG. 2 is the fact that there are provided on jaws 39 two ball catches 58, located opposite one another, with which machining tool 29 is held in lossproof fashion in gripper hand 38.

In the pivoted end position shown in FIG. 1, sensor 52 thus reports that gripper hand 38 is located behind workpiece 16 and above mechanism 17, so that the usual machining operation can be performed. Sensor 54 further reports that a machining tool 29 is received in gripper hand 38.

For insertion of the "two-piece" tool 15, gripper hand 38 is then introduced in the manner already described, by pivoting and displacement, into workpiece cavity 21, sensor 51 reporting that the linear end position shown with dashed lines in FIG. 1 has been reached. As soon as this linear end position has been reached, spindle 11 introduces adapter tool 32 into retaining bore 34 and rotates it so that the bayonet fastener snap-locks. As soon as this has happened, gripper hand 38 is pulled back out of workpiece cavity 21, ball catches 58 being overrun because machining tool 29 is now being held by adapter tool 32. Sensor 54 reports that machining tool 29 has left gripper hand 38. If this message does not occur, a fault exists.

As soon as sensor 52 reports that the pivoted end position has been reached, machining can begin.

Upon removal of machining tool 29, sensors 51 and 54 first report that gripper hand 38 has once again arrived in workpiece cavity 21, and moreover than adapter tool 29 has been correctly received in gripper hand 38. After uncoupling (by rotating spindle 11 in the opposite direction), first adapter tool 32 and then machining tool 29 can then be pulled out.

A description will now be given, with reference to FIG. 3, of the manner in which linear/pivot drive effects the constrainedly guided linear/pivot motion 46, 47.

First of all, it is evident that cylinder 49 is closed off at the right by an end piece 61 which carries a stem 62, extending centeredly through cylinder 49, on which piston 48 is displaceably and rotatably guided with a guide bore 63. An O-ring 65 is provided for sealing with respect to an inner cylinder wall 64, while a further O-ring provides sealing between stem 62 and guide bore 63. Also indicated in cylinder 49 is a stop sleeve 67 which is attached in suitable fashion at the left-hand end of cylinder 49.

FIG. 3 furthermore shows that piston 49 has a flange 68 in the region of O-ring 65.

In end piece 61 is a bore 69 which extends through stem 62 and faces toward a pressure chamber 71 in the interior of piston 48. Also provided is an aeration and venting bore 72 which is located in end piece 61 and leads to the back side of flange 68.

When pressure medium is then conveyed through connector 56 into bore 69, it enters pressure chamber 71 and pushes piston 48 to the left in FIG. 3 until flange 68 comes into contact with stop sleeve 67. The venting required on the back side of flange 68 takes place through aeration and venting bore 72.

Gripper hand 38 is now in the linear end position shown in FIG. 2.

In order to retract gripper hand 38, pressure medium is conveyed through connector 57 and through a bore 74 into an annular chamber 73 between piston 48 and inner cylinder wall 64. This pressure medium presses piston 48, via flange 68, to the right in FIG. 3, until it once again reaches the position shown in FIG. 3, where flange 68 is in contact at the right against end piece 61.

This linear stroke of piston 48 is now converted into a constrainedly guided linear/pivot motion. For this purpose, piston 48 has on its circumferential surface 76 a control gate 77 in the form of an externally open groove 78 into which engages a slide block 79 joined fixedly to cylinder 49.

FIG. 4 shows a developed view of control gate 77.

It is evident that linear stroke 47 has a first stroke segment 81 for which control gate 47 extends both radially and axially on circumferential surface 76. Adjoining this is a second stroke segment 82 for which control gate 77 extends on circumferential surface 76 only in the axial direction. This means, however, that during first stroke segment 81, piston 48 must execute both a linear stroke motion and a rotary motion indicated at 83.

Upon leaving its pivoted end position as shown in FIG. 1, gripper hand 38 thus first performs a combined linear stroke and pivot motion 81, 83, which is then followed by a pure linear stroke motion 82.

Figure 5:
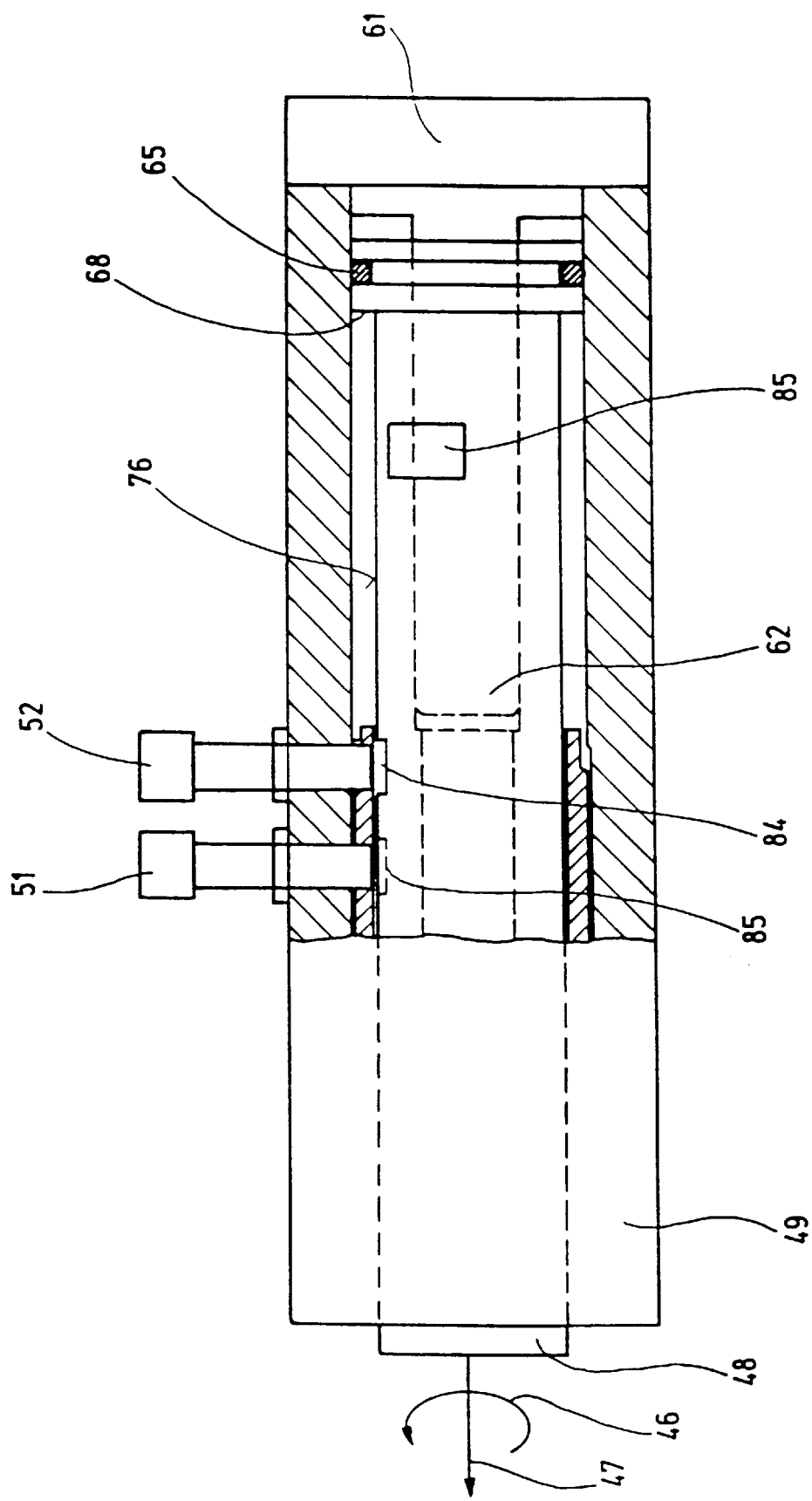
FIG. 5 shows a representation like that of FIG. 3, but showing the arrangement of the sensors, and the countersunk recesses associated therewith, for monitoring the end positions of the linear/pivot drive of FIG. 2.

FIG. 5 additionally shows, in a representation like that of FIG. 3, the coaction of sensors 51, 52 with countersunk recesses 84, 85 which are arranged on circumferential surface 76 of piston 48. Countersunk recesses 84, 85 are at an axial spacing from one another which corresponds to the combined length of linear stroke segments 81, 82. The two countersunk recesses 84, 85 are moreover at a radial spacing from one another which corresponds to rotation range 83.

In the position shown in FIG. 5, gripper hand 38 is located in its pivoted end position, which is detected by sensor 52 under which countersunk recess 84 is now located. When piston 48 is then extended, the coaction of slide block 79 and control gate 77 thus first results in a rotary motion 83 accompanied by a linear stroke motion 81, after which a pure linear stroke motion 82 then occurs. This causes countersunk recess 85 to end up under sensor 51, as indicated in FIG. 5 with dashed lines.

Although the two sensors 51 and 52 are thus located next to one another and on the same circumference with respect to cylinder 49, they can nevertheless, because of the specific arrangement of the two countersunk recesses 84, 85, monitor both the linear end position and the pivoted end position.

Therefore, what I claim, is:

1. A machine tool for machining a workpiece comprising
   a spindle with a spindle axis,
   an adaptor tool including an automatic coupling mechanism, the adaptor tool being operatively connected to the spindle,
   a workpiece having an opening in a wall thereof, which opening extends substantially perpendicularly to the spindle axis into a cavity of the workpiece,
   and a mechanism for clamping the workpiece,
   wherein a changing mechanism having a gripper hand for gripping a machining tool is provided, said machining tool having an automatic coupling mechanism, which gripper hand is arranged for inserting said machining tool substantially perpendicularly to said spindle axis through said opening into said workpiece cavity in such a way that said machining tool can be automatically coupled inside said workpiece cavity to the adapter tool carried by the spindle.

2. A machine tool of claim 1, wherein the gripper hand has two jaws which hold the machining tool in the axial direction.

3. A machine tool of claim 2, wherein the gripper hand has overrunnable snap-lock means for holding the machining tool.

4. A machine tool of claim 3, wherein the snap-lock means comprise two ball catches which are arranged opposite one another internally on the jaws.

5. A machine tool of claim 1, wherein a sensor, which detects whether the machining tool is correctly received in the gripper hand, is arranged on the gripper hand.

6. A machine tool of claim 1, wherein the gripper hand is arranged on a pivoting retaining arm which pivots the gripper hand, once pulled back out of the workpiece.

7. A machine tool of claim 6, wherein the retaining arm is arranged on a linear/pivot drive which additionally pivots the retaining arm to above the workpiece in contrainedly guided fashion during one segment of the retaining arm's linear stroke.

8. A machine tool of claim 7, wherein at least one sensor for monitoring a linear end position, and one sensor for monitoring a pivoted end position, are provided on the linear/pivot drive.

9. A machine tool for machining a workpiece comprising a spindle with a spindle axis, an adaptor tool including an automatic coupling mechanism, the adaptor tool being operatively connected to the spindle, a workpiece having an opening in a wall thereof, which opening extends substantially perpendicularly to the spindle axis into a cavity of the workpiece, and a mechanism for clamping the workpiece, wherein a changing mechanism having a gripper hand for gripping a machining tool is provided, said machining tool having an automatic coupling mechanism, which gripper hand is arranged for inserting said machining tool substantially perpendicularly to said spindle axis through said opening into said workpiece cavity in such a way that said machining tool can be automatically coupled inside said workpiece cavity to the adapter tool carried by the spindle, wherein the gripper hand is arranged on a pivoting retaining arm which pivots the gripper hand, once pulled back out of the workpiece, wherein the retaining arm is arranged on a linear/pivot drive which additionally pivots the retaining arm to above the workpiece in constrainedly guided fashion during one segment of the retaining arm's linear stroke, wherein at least one sensor for monitoring a linear end position, and at least one sensor for monitoring a pivoted end position, are pivoted on the linear/pivot drive.

10. A machine tool of claim 9, wherein the linear/pivot drive comprises a piston, joined to the retaining arm, which sits rotatably and displaceably in a cylinder, the piston having on its circumferential surface a control gate in the form of an externally open groove into which engages a slide block which is joined to the cylinder.

11. A machine tool of claim 10, wherein there are arranged on the circumferential surface of the piston two countersunk recesses, offset axially and radially from one another, one of which coacts with an associated sensor in the linear end position, and the other with an associated sensor in the pivoted end position.

12. A machine tool for machining a workpiece comprising a spindle with a spindle axis, an adaptor tool including an automatic coupling mechanism, the adaptor tool being operatively connected to the spindle, a workpiece having an opening in a wall thereof, which opening extends substantially perpendicularly to the spindle axis into a cavity of the workpiece, and a mechanism for clamping the workpiece, wherein a changing mechanism having a gripper hand for gripping a machining tool is provided, said machining tool having an automatic coupling mechanism, which gripper hand is arranged for inserting said machining tool substantially perpendicularly to said spindle axis through said opening into said workpiece cavity in such a way that said machining tool can be automatically coupled inside said workpiece cavity to the adapter tool carried by the spindle, wherein a sensor, which detects whether the machining tool is correctly received in the gripper hand, is arranged on the gripper hand.

* * * * *